Dec. 3, 1963   F. GRIFFITHS ETAL   3,112,987
PRODUCTION OF CUSHIONED SEATS
Filed March 7, 1960   6 Sheets-Sheet 1
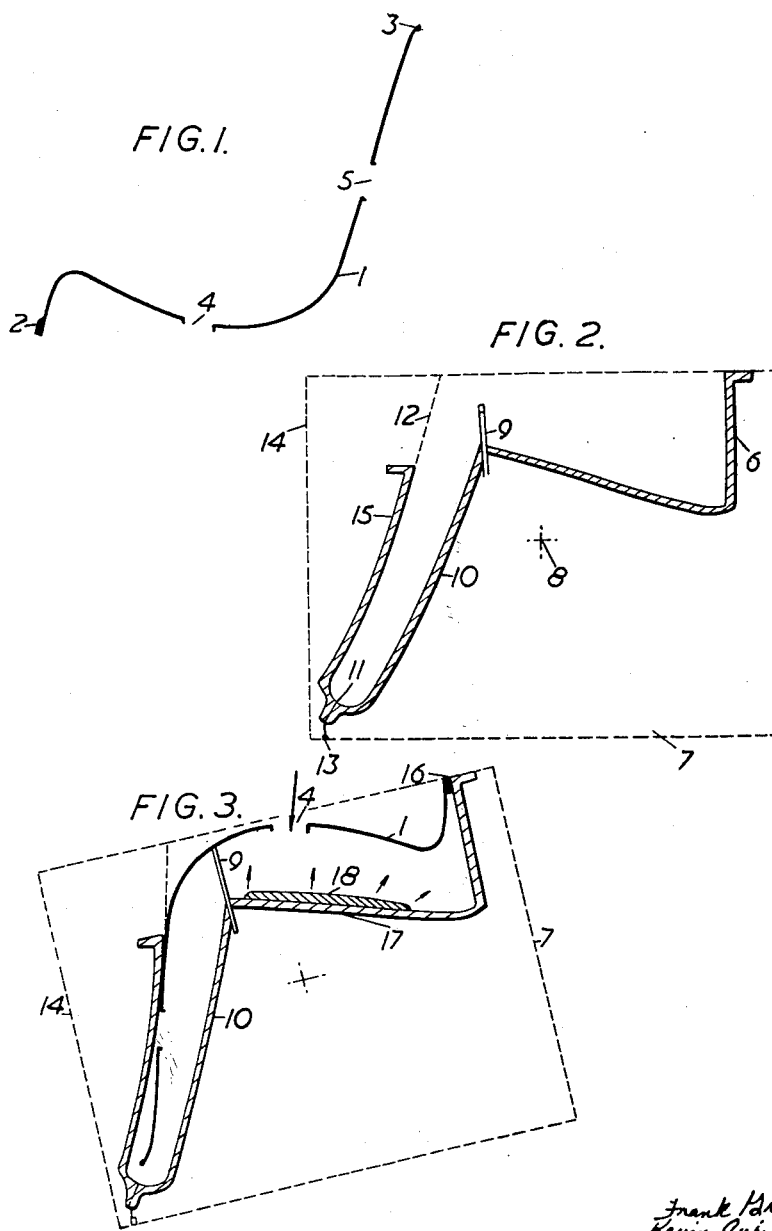
Frank Griffiths
Kevin Cyril Waldron
Ramon Rajan
 Inventors
By Scrivener and Parker
 Attorneys

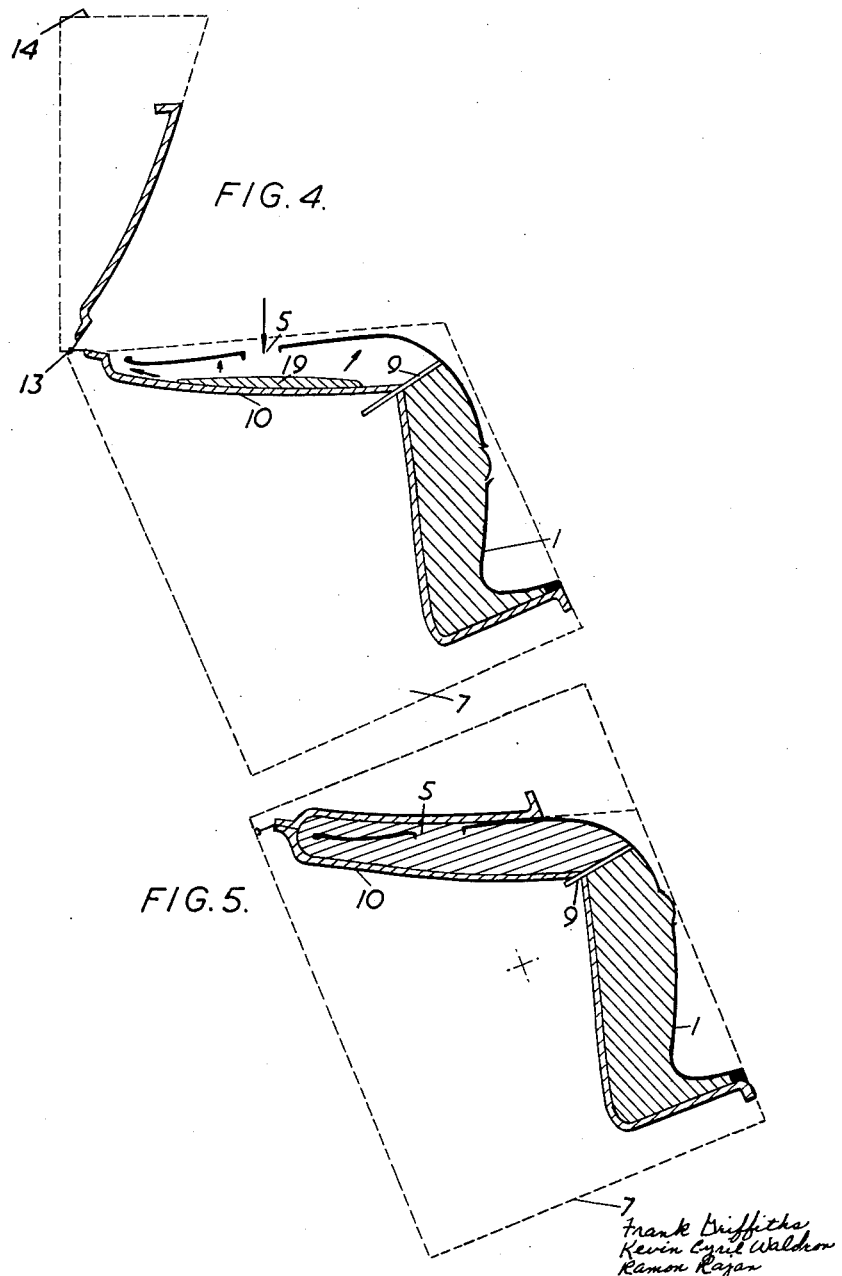

Dec. 3, 1963 F. GRIFFITHS ETAL 3,112,987
PRODUCTION OF CUSHIONED SEATS
Filed March 7, 1960 6 Sheets-Sheet 3
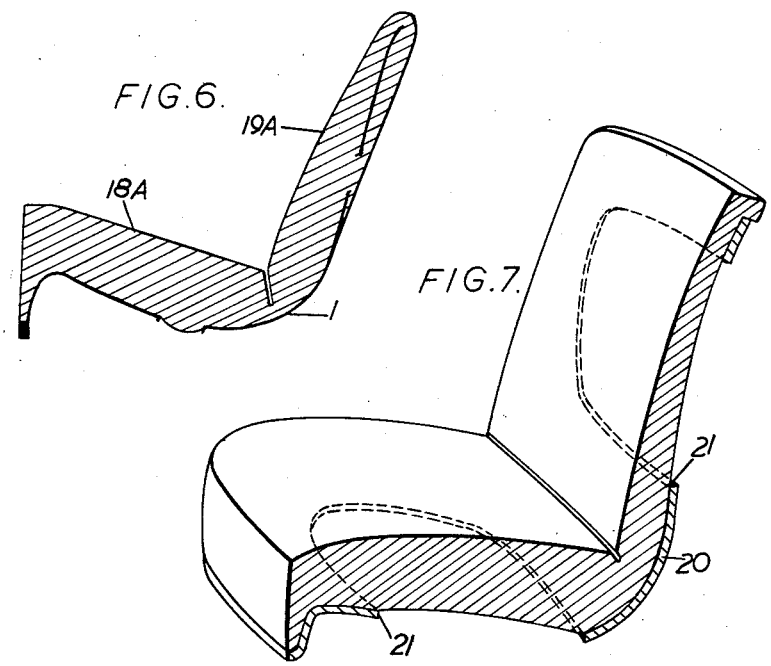
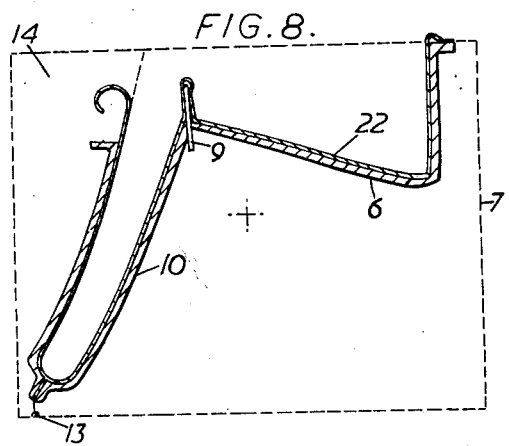
Frank Griffiths
Kevin Cyril Waldron
Ramon Rajan
Inventors
By Scrivener and Parker
Attorneys Dec. 3, 1963  F. GRIFFITHS ETAL  3,112,987
PRODUCTION OF CUSHIONED SEATS
Filed March 7, 1960  6 Sheets-Sheet 4
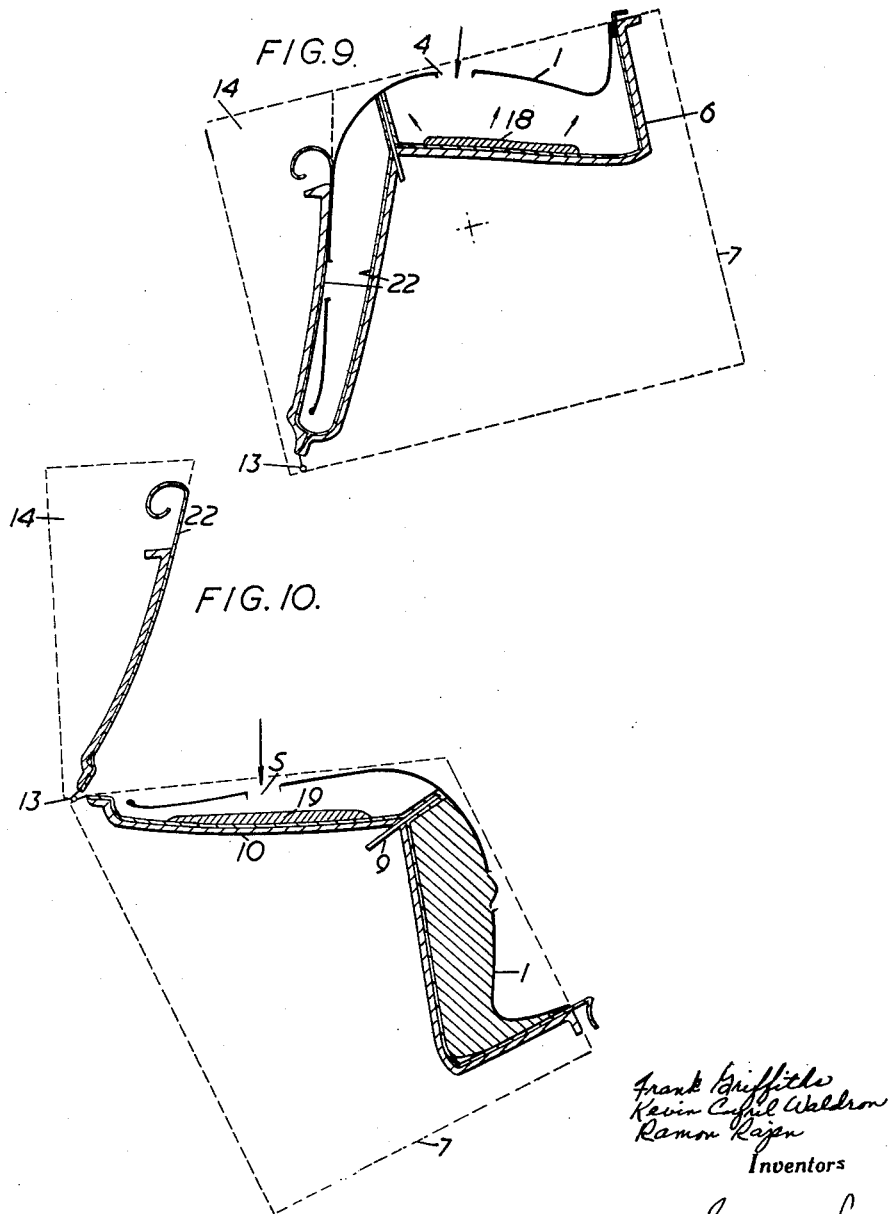
Frank Griffiths
Kevin Cyril Waldron
Ramon Rajen
Inventors
By Skinner and Parker
Attorneys

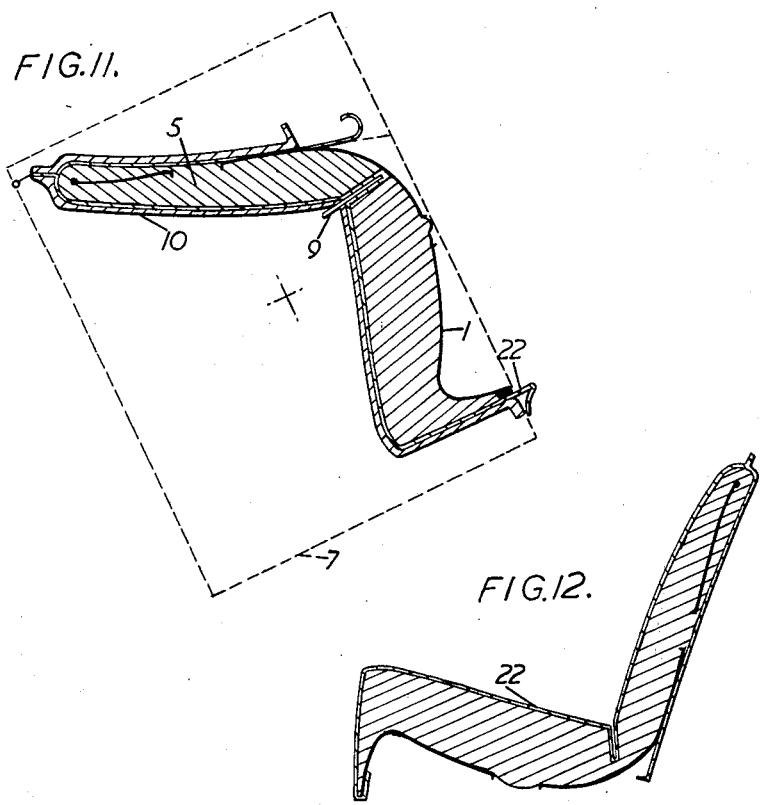

Dec. 3, 1963 F. GRIFFITHS ETAL 3,112,987
PRODUCTION OF CUSHIONED SEATS
Filed March 7, 1960 6 Sheets-Sheet 6
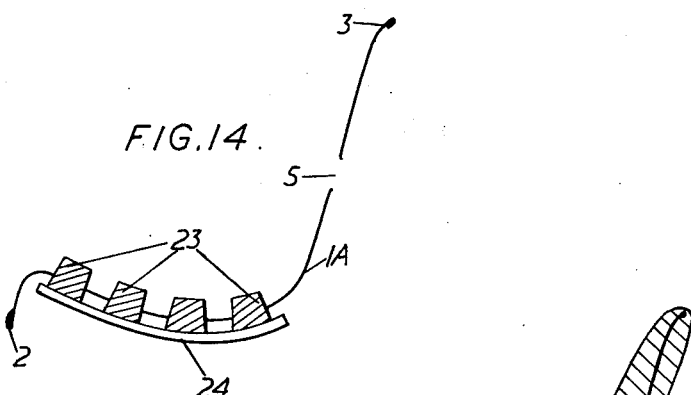
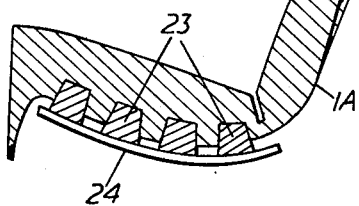
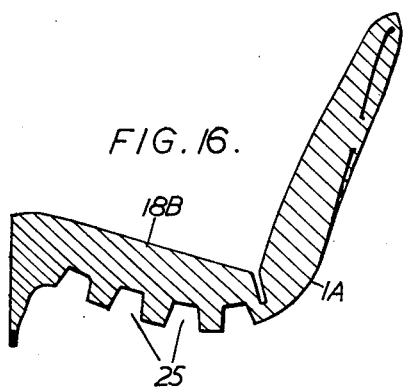

United States Patent Office 3,112,987
Patented Dec. 3, 1963

3,112,987
PRODUCTION OF CUSHIONED SEATS
Frank Griffiths, Ladywood, near Droitwich, Kevin Cyril Waldron, Shirley, Solihull, and Ramon Rajan, Marlbrook, Bromsgrove, England, assignors to The Austin Motor Company Limited, Longbridge, England
Filed Mar. 7, 1960, Ser. No. 13,095
Claims priority, application Great Britain Mar. 26, 1959
4 Claims. (Cl. 18—59)

This invention relates to the production of cushioned seats, the cushioning material being a polyurethane foam of the polyether type.

According to the invention a method of making a cushioned seat comprises employing a rigid mono-piece or pan-type seat frame as one shell of a mold the complementary shell of which is shaped to combine both the cushion and backrest portions of the seat; introducing into one portion of the assembled mold a foam-forming mixture of a polyether/isocyanate resin and an activator in such quantity that the resulting plastic foam just fills the relevant mold portion when foaming ceases; repeating that procedure for the other mold portion; and allowing the plastic foam to set before removing the cushioned seat assembly.

The invention offers significant advantages compared with conventional materials and techniques. This is especially so in the case of motor vehicle seats, which, hitherto, have had to be assembled by hand. The invention makes it possible to employ automation in seat assembly, with consequent reduction or elimination of assembly labour. Apart from that possibility, the invention results in appreciable saving of costs because there is no wastage of material (i.e. no cut-offs arise), the total cost of the materials used is less and the assembly costs are almost negligible in comparison with those entailed by the use of conventional materials. Moreover, there is a considerable gain in simplicity inasmuch as the total number of components in a typical motor car seat is reduced from forty to about five. Also, it is estimated that use of the invention should effect a saving of from 1 lb. to 4 lbs. in the weight of a given size of seat.

For example, the molded foamed plastic cushioning material replaces the rubber cushion or metallic springs, "Hairlok," padding, wadding and rubberized straps employed in a typical bucket-type seat for a motor vehicle.

Other notable advantages are afforded by the invention. It enables seat cushions and squabs to be shaped anatomically without fabrication, and without increase in cost. Further, the molding technique results in seat components of constant dimensions. This attribute greatly facilitates the operation of trimming the seat, since it enables tightly-fitting covers to be applied and obviates the adjustments which the seat trimmer normally finds it necessary to make. In this connection, a subsidiary feature of the invention comprises providing that mold shell which is complementary to the seat frame with a lining of fabric or other seat covering material, so that the cushioned seat is produced with an integral fabric covering.

Referring to the accompanying drawings:

FIGURE 1 is a side elevation, representing diagrammatically a section in the median vertical plane, of a pan-type seat frame employed in carrying out the invention;

FIGURE 2 is a sectional side elevation of a mold shell employed in carrying out the invention, and mounted in a box-like structure represented in dotted outline;

FIGURE 3 shows the seat frame of FIGURE 1 associated with the mold shell of FIGURE 2 to complete the mold, and depicts the state of affairs just after the foam-forming material has been poured into a section of the mold;

FIGURES 4 and 5 respectively depict further stages in the sequence of operations involved;

FIGURE 6 shows the completed seat diagrammatically in sectional side elevation;

FIGURE 7 is a sectional perspective view of a seat constructed in accordance with the invention, and having a modified pan-type frame;

FIGURES 8 to 12, which correspond respectively to FIGURES 2 to 6, illustrate a modification by which the seat is produced with an integral fabric covering;

FIGURES 13 to 15 illustrate diagrammatically means (applied to a seat frame of the type shown in FIGURE 1) by which cavities are formed in the base of the seat cushion; and FIGURE 16 shows the corresponding completed seat diagrammatically in sectional side elevation.

The pan-type or mono-piece seat frame 1 depicted in FIGURE 1 may be fabricated as a steel pressing, or be molded in reinforced plastics material (e.g. hand-laid resin-bonded glass fibres). Its edges are flanged or otherwise reinforced, as at 2 and 3, and it has two holes 4 and 5 located approximately centrally in the base and backrest portions respectively.

A mold shell 6 (FIG. 2) is supported within a box-like structure 7 which is pivotally mounted on a horizontal axis 8. A slidable partition 9 is arranged at the junction of those portions of the mold shell 6 which pertain respectively to the cushion and squab of the seat. The squab portion 10 is jointed at 11, and the box-like structure 7 is jointed at 12 and hinged at 13; so that it has a hinged lid 14 to which the part 15 of the squab portion 10 is fixed.

A parting agent is applied to the partition 9 and to the entire inner surface of the mold shell 6 to prevent the foam from adhering to any part of it. This parting agent may be a wax, or a quick-release resin, or it may be a permanent film of a styrene compound, polytetrafluorethylene or polythene.

The seat frame 1 is arranged, as shown in FIGURE 3, to form the other shell of the mold, and is located by temporary clamping means (not shown) applied at 16. The box-like structure 7 is next tilted so that the part 17 of the mold shell 6 is disposed substantially horizontally.

The materials employed to produce the polyether foam are as follows:

| Material: | Parts by weight |
|---|---|
| Polyether/isocyanate resin | 100 |
| Activator | 4.72 |

The activator which is of the conventional type employed in the production of plastic foam, is added to the resin and thoroughly mixed with it by stirring for from 5 to 10 seconds. Prior to mixing, the temperature of the resin must be less than 22° C. in order to obtain good results. As foaming commences almost at once, the material is poured into one section of the mold through the hole 4 immediately after completion of mixing. FIGURE 3 indicates the foam 18 forming in the cushion part of the mold, which is segregated from the squab part by the partition 9. It is essential that the quantity of material poured into the relevant section of the mold should be exactly that required just to fill it when foaming ceases. Foaming proceeds for about three to six minutes, and the mold assembly is not tilted until foaming has been completed.

The box-like structure 7 is next tilted to the position depicted in FIGURE 4, so that the squab portion 10 is disposed approximately horizontally, and the hinged lid 14 is opened to enable the foam-forming material to be poured through the hole 5 into the squab part of the mold.

The foam is indicated being formed at 19. As before, the quantity of material poured into the mold section concerned must be exactly that needed to fill it when foaming has ceased. The lid 14 is closed after pouring has been completed, and the mold assembly remains in the condition represented in FIGURE 5 until foaming is complete. It will be observed, from that illustration, that the foam rises through the hole 5 and extends around the upper portion of the backrest of the seat frame 1.

Although the partition 9 is indicated in FIGURE 4 as still being in contact with the seat frame 1; it, is in practice, partly withdrawn either before pouring the foam-forming material into the hole 5 or shortly afterwards. In consequence, the foam in the squab part of the mold unites with that section of the foam in the cushion part of the mold which has become exposed by the partial withdrawal of the partition 9. This explains why the gap indicated in FIGURE 6 between the cushion and squab terminates short of the seat frame 1.

The mold can be opened about half an hour after completion of foaming. The seat frame 1, with the integral overlay of plastic foam adhering to it, is removed from the mold and transferred to an oven at a temperature of 120° C., the foam being cured for from one to four hours. FIGURE 6 shows the completed seat diagrammatically. The seat cushion 18A is integral with the squab 19A, and the upper part of the backrest of the frame 1 is shrouded by the plastic foam.

Apart from having a choice of densities in homogeneous foamed plastic, it is possible to layer the foamed material. For example, the seat cushion could be molded having a top layer of soft foam backed by a layer of harder foam.

If desired, instead of having the pouring holes 4 and 5, the seat frame may be made as illustrated in FIGURE 7. In this case a pan-type frame 20, fabricated in any of the ways mentioned above, is formed with quite a large opening 21, of approximately rectangular shape, in its base and backrest portions respectively. This alternative design gives a much lighter seat frame, and enables less foam to be used since, as will readily be appreciated, the openings 21 result in a greater feeling of softness being afforded in the regions where this is most needed, with less thickness of foam than would otherwise be required.

The seats illustrated in FIGURES 6 and 7 can be finished by applying any desired kind of trim. For example, they may be fitted with a prefabricated covering molded (preferably either by the vacuum-forming or slush molding technique) in flexible plastic sheet material, such as polyvinyl chloride; or be electrostatically flock-sprayed; or be provided with a flexible film-like covering of a plastic material or rubber or an elastomer applied by spraying.

In the modification illustrated in FIGURES 8 to 12 a seat is produced complete with an integral covering 22. The seat covering material, which is initially arranged to serve as a lining for the mold shell 6 (see FIGURE 8), may either be made in situ or be preformed and then placed in the mold shell. In either case the covering 22 may be made by any convenient method, such as vacuum-forming, slush molding, injection molding or blow molding.

After the mold shell 6 has been lined with the covering 22, the sequence of operations (FIGURES 9 to 11) is the same as described with reference to FIGURES 3 to 5. The plastic foam adheres to the covering 22, and, after removal from the curing oven, the assembly is transferred to the curing oven.

Referring to FIGURE 13, a pan-type seat frame 1A has in its base portion an array of holes into which removable plugs 23 are inserted from the underside. These plugs, made of any appropriate material (for example, wood or metal) to which one of the parting agents previously mentioned has been applied, are either wedged in the holes one by one or, as indicated in FIGURE 14, are attached to a common base member 24 and inserted as an assembly into the holes. Although not indicated in FIGURES 13 and 14, the hole 4 of FIGURES 1 and 9 is, of course, provided in the base portion of the seat frame 1A. The molding operatings are performed in the same way as described with reference to FIGURES 3 to 5 or FIGURES 9 to 11, as the case may be, and the assembly removed from the mold is as shown in FIGURE 15 (assuming that the base member 24 has been employed).

The plugs 23 are withdrawn after the seat assembly has been removed from the mold, leaving corresponding cavities 25 (FIG. 16) in the plastic foam, of the same shape as the plugs. The latter are preferably tapered to facilitate withdrawal.

The provision of the cavities 25 in the base of the seat cushion 18B is an alternative to the expedient of using different layers of plastic foam, mentioned earlier.

We claim:

1. A method of making a cushioned seat, which comprises employing a rigid pan-type seat and backrest frame as one shell of a mold the complementary shell of which is shaped to combine both the cushion and backrest portions of the seat; introducing into one portion of the assembled mold a foam-forming mixture of a polyether/isocyanate resin and an activator in such quantity that the resulting plastic foam just fills the relevant mold portion when foaming ceases; subsequently introducing the foam forming mixture and activator into the other mold portion; and allowing the plastic foam to set before removing the cushioned seat assembly, the cushion and backrest portions of the mold being initially segregated by a slidable partition at their junction, but after foaming has ceased in said one mold portion the partition is partly withdrawn so that the section of foam thereby exposed becomes united with the foam subsequently formed in said other mold portion.

2. A method according to claim 1, in which the portion of that mold shell into which the foam-forming mixture is initially introduced is disposed substantially horizontally, and is maintained so until foaming has ceased.

3. A method according to claim 1, in which that mold shell which is complementary to the seat frame is lined with a fabric, so that the cushioned seat is produced with an integral fabric covering.

4. A method according to claim 1, in which the portion of the mold shell into which the foam-forming mixture is subsequently introduced is disposed substantially horizontally, and is maintained so until foaming has ceased.

References Cited in the file of this patent

UNITED STATES PATENTS

| | | |
|---|---|---|
| 929,938 | Haldeman | Aug. 3, 1909 |
| 2,341,979 | Cunnington | Feb. 15, 1944 |
| 2,808,875 | Bargen | Oct. 8, 1957 |
| 2,826,244 | Hurley | Mar. 11, 1958 |
| 2,838,100 | Follows | June 10, 1958 |
| 2,892,489 | Hurley | June 30, 1959 |
| 2,898,634 | Alderfer | Aug. 11, 1959 |
| 2,910,730 | Risch | Nov. 3, 1959 |

FOREIGN PATENTS

| | | |
|---|---|---|
| 846,020 | Great Britain | Aug. 24, 1960 |
| 1,164,827 | France | Oct. 14, 1958 |